United States Patent [19]

Detering et al.

[11] Patent Number: 5,846,924

[45] Date of Patent: Dec. 8, 1998

[54] USE OF VINYLPYRROLIDONE AND VINYLIMIDAZOLE COPOLYMERS AS DETERGENT ADDITIVES, NOVEL POLYMERS OF VINYLPYRROLIDONE AND OF VINYLIMIDAZOLE, AND PREPARATION THEREOF

[75] Inventors: Juergen Detering, Limburgerhof; Christian Schade; Wolfgang Trieselt, both of Ludwigshafen; Juergen Tropsch, Altrip, all of Germany

[73] Assignee: BASF Aktiengesellschaft, Ludwigshafen, Germany

[21] Appl. No.: 694,023

[22] Filed: Aug. 8, 1996

Related U.S. Application Data

[63] Continuation of Ser. No. 325,177, filed as PCT/EP93/02851, Oct. 15, 1993, Pat. No. 5,627,151.

[30] Foreign Application Priority Data

Oct. 23, 1992 [DE] Germany .......................... 42 35 798.5

[51] Int. Cl.$^6$ ................. C11D 3/28; C11D 3/37
[52] U.S. Cl. ........................... 510/475; 510/360
[58] Field of Search ..................... 510/360, 475

[56] References Cited

U.S. PATENT DOCUMENTS 5,207,941  5/1993  Kroner et al. .................... 252/174.23

FOREIGN PATENT DOCUMENTS 1348212  3/1974  United Kingdom .

Primary Examiner—Richard L. Raymond
Assistant Examiner—Deepak Rao
Attorney, Agent, or Firm—Oblon, Spivak, McClelland, Maier & Neustadt, P.C.

[57] ABSTRACT

There are described the use of copolymers obtainable by free-radically initiated copolymerization of monomer mixtures comprising (a) 60–99% by weight of 1-vinylpyrrolidone, 1-vinyl-imidazole or mixtures thereof, (b) 1–40% by weight of nitrogen-containing, basic ethylenically unsaturated monomers in the form of the free bases, in the form of salts or in quaternized form, and optionally (c) up to 20% by weight of other monoethylenically unsaturated monomers, as detergent additives for inhibiting dye transfer during the wash, detergents which contain such polymers, and polymers which are obtainable by free-radically initiated polymerization of (a) 1-vinylpyrrolidone, 1-vinylimidazole, 1-vinylimidazolium compounds, or mixtures thereof, and optionally (b) other nitrogen-containing, basic ethylenically unsaturated monomers in the form of the free bases, in the form of the salts or in quaternized form, and/or (c) other monoethylenically unsaturated monomers, in an aqueous medium in the presence of water-soluble proteins and a process for the preparation of the polymers by polymerising the monomers (a) and optionally (b) and/or (c) in an aqueous medium in the presence of water-soluble proteins using from 0.5 to 400 parts by weight of protein per 100 parts by weight of monomer used in the polymerization.

7 Claims, No Drawings

USE OF VINYLPYRROLIDONE AND VINYLIMIDAZOLE COPOLYMERS AS DETERGENT ADDITIVES, NOVEL POLYMERS OF VINYLPYRROLIDONE AND OF VINYLIMIDAZOLE, AND PREPARATION THEREOF

This is a Continuation of application Ser. No. 08/325,177 filed on Apr. 21, 1995, now U.S. Pat. No. 5,627,151, which was filed as International Application No. PCT/EP93/02851 on Oct. 15, 1993.

The present invention relates to the use of copolymers of 1-vinylpyrrolidone and 1-vinylimidazole with nitrogen-containing basic ethylenically unsaturated monomers in the form of the free bases, in the form of the salts with organic or inorganic acids or in quaternized form as detergent additives for inhibiting dye transfer during the wash; to novel polymers of vinylpyrrolidone, vinylimidazole and vinylimidazolium compounds; to processes for preparing same; and to their use in detergents.

DE-B-2 232 353 discloses detergent and cleaner mixtures consisting essentially of from 95 to 60% by weight of nonionic detergents and from 5 to 40% by weight of a partially or completely water-soluble polyvinylpyrrolidone and essentially free of anionic surface-active agents. The vinylpyrrolidone polymers inhibit the transfer of dye from colored to white textiles during the wash. The vinylpyrrolidone polymers have molecular weights within the range from about 10,000 to about 1,000,000. Not only homopolymers but also copolymers of vinylpyrrolidone are contemplated. Suitable comonomers are said to be acrylonitrile and maleic anhydride. However, the effectiveness of the vinylpyrrolidone dye/color transfer inhibitors is greatly impaired by anionic surfactants.

DE-A-2 814 287 discloses detergent and cleaner compositions containing anionic and/or nonionic surfactants, builders and other customary detergent additives and also, as stain inhibitors, from 0.1 to 10% by weight of water-soluble or water-dispersible homo- or copolymers of N-vinylimidazole. The polymers have a specific viscosity of from 0.01 to 5 in a 1% strength by weight aqueous solution at 20° C.

Tenside 28, pages 428 to 433 (1991) discloses using polyvinylimidazole, polyvinylpyrrolidone and copolymers of vinylpyrrolidone and acrylamide or vinylimidazole and acrylamide as color transfer inhibitor in the wash liquor in the washing of textile materials.

WO-A-90/01920 discloses for example copolymers which contain vinylpyrrolidone and quaternized basic monomers, such as dimethylaminopropylacrylamide, in polymerized form. The polymers are used in cosmetic formulations, such as hairsprays or skin care agents.

EP-A-0 337 354 relates to hair shampoos which contain for example alkylpolyglucosides as surface-active agent and a cationic polymer. Suitable cationic polymers include for example copolymers of diallylammonium salts and acrylamide or quaternized polyvinylpyrrolidone.

EP-A-0 013 585 discloses dishwashing agents which include an anionic surface-active agent, a nonionic surface-active agent or mixtures thereof, a copolymer of N-vinylpyrrolidone and dimethylaminoethyl methacrylate and an alkali metal salt of casein.

EP-A-0 457 205 discloses the use of water-soluble or water-dispersible grafted proteins which are obtainable by free-radically initiated copolymerization of monoethylenically unsaturated monomers in the presence of proteins, as detergent and cleaner additives. The grafted proteins improve the primary and secondary detergency and also the soil-release properties of phosphate-free and low-phosphate detergent and cleaner formulations.

The abovementioned polymers with the exception of the grafted proteins described in EP-A-0 457 205 have the disadvantage that they are neither biodegradable nor removable from water by adsorption on sewage sludge.

It is an object of the present invention to provide a detergent additive which inhibits dye transfer during the wash and is at least eliminable from water by adsorption on sewage sludge.

We have found that this object is achieved by the use of copolymers obtainable by free-radically initiated copolymerization of monomer mixtures comprising (a) 60–99% by weight of 1-vinylpyrrolidone, 1-vinylimidazole or mixtures thereof, (b) 1–40% by weight of N,N'-dialkylaminoalkyl (meth)acrylates, N,N'-dialkylaminoalkyl(meth)acrylamides, 4-vinylpyridine, 2-vinylpyridine and/or diallyldialkylamines, each in the form of the free bases, in the form of a salt or in quaternized form, and/or 1-vinylimidazolium compounds of the formula

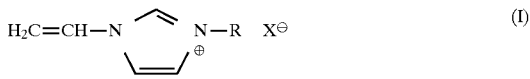

where R is $C_1$–$C_{18}$-alkyl or benzyl and $X^{\ominus}$ is an anion, and optionally (c) up to 20% by weight of other monoethylenically unsaturated monomers, as detergent additives for inhibiting dye transfer during the wash. We have additionally found that the object is also achieved by polymers obtainable by free-radically initiated polymerization of (a) 1-vinylpyrrolidone, 1-vinylimidazole, 1-vinylimidazolium compounds of the formula

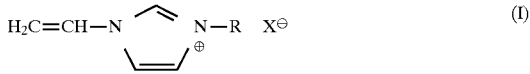

where R is hydrogen, $C_1$–$C_{18}$-alkyl or benzyl and $X^{\ominus}$ is an anion, or mixtures thereof, and optionally (b) other nitrogen-containing, basic ethylenically unsaturated monomers in the form of the free bases, in the form of the salts with organic or inorganic acids or in quaternized form, and/or (c) other monoethylenically unsaturated monomers which are copolymerizable with the monomers (a) and (b), in an aqueous medium in the presence of water-soluble proteins or partially degraded proteins using from 0.5 to 400 parts by weight of protein per 100 parts by weight of monomer used in the polymerization.

The polymers are prepared by polymerizing the monomers (a) and optionally (b) and/or (c) in an aqueous medium in the presence of water-soluble proteins or partially degraded proteins in the presence of free-radical initiators using from 0.5 to 400 parts by weight of protein per 100 parts by weight of monomer. The polymers thus obtainable are used as detergent additives for inhibiting dye transfer during the wash.

The above-described polymers are surprisingly adsorbed from water on sewage sludge. Some are even biodegradable.

The copolymers which, according to the invention, are used as detergent additives are prepared by copolymerization of monomer mixtures containing as component (a)

1-vinylpyrrolidone, 1-vinylimidazole or mixtures of the two monomers in any desired ratio. The monomers of group (a) are present in the monomer mixture in a proportion of 60–99, preferably 80–95, % by weight.

Component (b) of the monomer mixture comprises nitrogen-containing, basic ethylenically unsaturated monomers in the form of the free bases, in the form of the salts with organic or inorganic acids or in quaternized form. Suitable nitrogen-containing, basic ethylenically unsaturated compounds are for example N,N'-dialkylaminoalkyl (meth)acrylates, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, dimethylaminobutyl methacrylate, dimethylaminoneopentyl acrylate and dimethylaminoneopentyl methacrylate. Further suitable basic monomers of this group are N,N'-dialkylaminoalkyl(meth)acrylamides, eg. N,N'-di-C1-C3-alkylamino-C2-C6-alkyl(meth)acrylamides, such as dimethylaminoethyl-acrylamide, dimethylaminoethylmethacrylamide, diethylaminoethylacrylamide, diethylaminoethylmethacrylamide, dipropylaminoethylacrylamide, dipropylaminoethylmethacrylamide dimethylaminopropylacrylamide, dimethylaminopropylmethacrylamide, diethylaminopropylacrylamide, diethylaminopropylmethacrylamide, dimethylaminoneopentylacrylamide, dimethylaminoneopentylmethacrylamide and dialkylaminobutylacrylamide. Further suitable monomers of this group are 4-vinylpyridine, 2-vinylpyridine and/or diallyl(di)alkylamines in which the alkyl group has from 1 to 12 carbon atoms. The abovementioned basic monomers are used in the copolymerization in the form of the free bases, in the form of the salts with organic or inorganic acids or in quaternized form. Suitable for salt formation are for example carboxylic acids having from 1 to 7 carbon atoms, eg. formic acid, acetic acid or propionic acid, benzenesulfonic acid, p-toluenesulfonic acid or inorganic acids such as halohydric acids, eg. hydrochloric acid or hydrobromic acid. The above-exemplified basic monomers can also be used in quaternized form. Suitable quaternizing agents are for example alkyl halides having from 1 to 18 carbon atoms in the alkyl group, eg. methyl chloride, methyl bromide, methyl iodide, ethyl chloride, propyl chloride, hexyl chloride, dodecyl chloride, lauryl chloride and benzyl halides, in particular benzyl chloride and benzyl bromide. The quaternization of the nitrogen-containing basic monomers can also be effected by reacting these compounds with dialkyl sulfates, in particular diethyl sulfate or dimethyl sulfate. Examples of quaternized monomers of this group are trimethylammoniumethyl methacrylate chloride, dimethylethylammoniumethyl methacrylate ethosulfate and dimethylethylammoniumethyl methacrylamide ethosulfate. Further suitable monomers of group (b) are 1-vinylimidazolium compounds of the formula

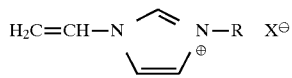

(I)

where R is hydrogen, $C_1$–$C_{18}$-alkyl or benzyl and $X^{\ominus}$ is an anion.

The anion can be a halogen ion or else the radical of an inorganic or organic acid. Examples of quaternized 1-vinylimidazoles of the formula I are 3-methyl-1-vinylimidazolium chloride, 3-benzyl-1-vinylimidazolium chloride, 3-n-dodecyl-1-vinylimidazolium bromide and 3-n-octadecyl-1-vinylimidazolium chloride. The monomers of group (b) can be used alone or mixed with one another. They are used in the copolymerization with the monomers of group (a) in amounts of from 1 to 40, preferably from 5 to 20, % by weight.

However, the monomers of group (b) can also be used in the copolymerization in the form of the free bases. The copolymers thus obtainable can then, if desired, be quaternized by reaction with customary quaternizing agents, eg. methyl chloride or benzyl chloride, or be converted into the salt form by treatment with acids. Of course, those polymers which contain 1-vinylimidazole (group (a)) as copolymerized units can also be quaternized by reaction with customary quaternizing agents, eg. methyl chloride or dimethyl sulfate.

The copolymerization of the monomers (a) and (b) may be carried out in the presence of (c) up to 20% by weight of other monoethylenically unsaturated monomers which are copolymerizable with the monomers (a) and (b). Suitable monomers of this group (c) are for example vinyl acetate, vinyl propionate, vinyl butyrate, acrylonitrile, methacrylonitrile, acrylamide, methacrylamide, $C_1$–$C_8$-alkyl (meth)acrylate, styrene and $C_1$–$C_8$-hydroxyalkyl (meth)acrylates.

If the monomers of group (c) are used in the copolymerization, they can be used either alone or mixed with one another.

The monomers of group (c) are merely used for modifying the copolymers formed from the monomers (a) and (b). If they are used, their proportion of the monomer mixture is preferably from 5 to 15% by weight.

Novel polymers are obtained when the polymerization of
(a) 1-vinylpyrrolidone, 1-vinylimidazole, 1-vinylimidazolium compounds of the above-indicated formula I or mixtures thereof and optionally
(b) other nitrogen-containing basic ethylenically unsaturated monomers in the form of the free bases, in the form of the salts with organic or inorganic acids or in quaternized form, and/or
(c) other ethylenically unsaturated monomers which are copolymerizable with the monomers (a) and (b)

is carried out in an aqueous medium in the presence of water-soluble proteins or partially degraded proteins. From 0.5 to 400 parts by weight of protein are used in the polymerization per 100 parts by weight of monomer used in the polymerization. The monomers of group (b) were mentioned earlier in connection with the description of the copolymers. For the purposes of preparing the novel polymers the compounds of the formula I are excepted from group (b) and are classified in monomer group (a). The homo- or copolymerization of the above-indicated groups of monomers is carried out in an aqueous medium in the presence of water-soluble or partially degraded proteins. Suitable proteins include all vegetable, animal or microorganism proteins or appropriately modified proteins, provided they are soluble in water. Unlike globular proteins, which are usually readily soluble in water, the fibrous proteins known as scleroproteins (keratin, elastin, fibroin and collagen) are in general not soluble in water. However, these proteins can be at least partially degraded so that they become soluble in water. Partial degradation of these proteins is possible for example by enzymatic, acidic or alkaline hydrolysis. Of the scleroprotein partial hydrolyzates, those based on collagen are preferred. The amount of water-soluble or water-solubilized, partially degraded protein used per 100 parts by weight of monomer used in the polymerization is from 0.5 to 400, preferably from 10 to 200, parts by weight.

The homo- and copolymers are prepared by polymerizing the monomers (a) and optionally (b) and/or (c) in an aqueous medium in the presence of water-soluble or partially degraded proteins and in the presence of free-radical initiators using from 0.5 to 400 parts by weight of water-soluble protein per 100 parts by weight of monomer. Suitable free-radical initiators include all customary peroxy and azo compounds, for example peroxides, hydroperoxides and peroxy esters, eg. hydrogen peroxide, dibenzoyl peroxide, di-t-butyl peroxide, t-butyl hydroperoxide, t-butyl perpivalate and t-butyl peroxy-2-ethylhexanoate, and also azo compounds, eg. 2,2'-azobis(2-amidinopropane) dihydrochloride, 2,2'-azobis(2-methylbutyronitrile) and 2,2'-azobis[2-(2-imidazolin-2-yl)propane] dihydrochloride. It is of course also possible to use initiator mixtures or the known redox initiators. The polymerization temperature is preferably within the range from 60° to 100° C. It is of course also possible to polymerize outside the stated temperature range, provided that at higher temperatures, for example at from 120° to 140° C., the polymerization is carried out in apparatus sealed pressure-tight or in a high boiling solvent. The initiators are used in the customary amounts, ie. in amounts of, for example, 0.2–5 percent by weight, based on the monomers to be polymerized. If the novel copolymers are to be prepared, the preferred monomers of group (b) are N,N'-dialkylaminoalkyl (meth)acrylates and/or N,N'-dialkylaminoalkyl(meth)-acrylamides. The K value of the polymers is within the range from 10 to 350 (determined by the method of H. Fikentscher at 25° C. and pH 7 on a 1% strength aqueous solution).

The above-described copolymers and the novel homo- and copolymers which are prepared in the presence of water-soluble proteins are used as detergent additives for inhibiting the transfer of dye during the wash. The detergents can be pulverulent or else be in liquid form.

The compositions of detergent and cleaner formulations can differ greatly. Detergent and cleaner formulations customarily contain from 2 to 50% by weight of surfactants with or without builders. These percentages hold not only for liquid but also for pulverulent detergents. Detergent and cleaner formulations customary in Europe, the USA and Japan can be found for example depicted in table form in Chemical and Engineering News, 67, (1989), 35. Further information on the composition of detergents and cleaners can be found in WO-A-90/13581 and in Ullmanns Encyklop ädie der technischen Chemie, Verlag Chemie, Weinheim 1983, 4th edition, pages 63–160. The detergents may additionally contain a bleach, for example sodium perborate, which if used can be present in the formulation in amounts of up to 30% by weight. Detergents and cleaners may contain further customary additives, for example complexing agents, opacifiers, optical brighteners, enzymes, perfume oils, other color transfer inhibitors, grayness inhibitors and/or bleach activators.

Detergents based on surfactants with or without builders and other customary constituents contain according to the invention from 0.1 to 10% by weight of copolymers obtainable by free-radically initiated copolymerization of monomer mixtures of (a) 60–99% by weight of 1-vinylpyrrolidone, 1-vinylimidazole or mixtures thereof, (b) 1–40% by weight of nitrogen-containing, basic ethylenically unsaturated monomers in the form of the free bases, in the form of the salts with organic or inorganic acids or in quaternized form, and optionally (c) up to 20% by weight of other monoethylenically unsaturated monomers.

The copolymers act as color transfer inhibitors in the washing of dyed textiles.

In the Examples the percentages are by weight. The K values were determined by the method of H. Fikentscher, Cellulose-Chemie, 13, (1932), 58–64, 71–74, at 25° C. and pH 7 on an aqueous solution with a polymer concentration of 1 percent by weight. If the K value was determined at a different concentration or in a different solvent, this is indicated for the particular polymer.

Preparation of polymers

EXAMPLES

Polymer 1

A mixture of 63 g of 1-vinylpyrrolidone (VP), 7 g of N,N'-dimethylaminopropylacrylamide (DMAPMA), 0.7 g of 2,2'-azobis(2-amidinopropane) dihydrochloride and 200 g of water was brought to pH 8 with dilute hydrochloric acid and heated with stirring under nitrogen to 70° C. Once that temperature was reached, the metered addition was commenced of stream 1 (mixture of 162 g of VP, 18 g of DMAPMA and 250 g of water, brought to pH 8 with hydrochloric acid), which would take for 5 h, and of stream 2 (1.8 g of 2,2'-azobis(2-amidinopropane) dihydrochloride in 65 g of water), which would take 6 h. The reaction mixture was stirred at 70° C. for a further 2 h and then diluted with 400 g of water. A clear solution was obtained. The polymer had a K value of 90.2.

Polymer 2

A mixture of 228 g of VP, 12 g of N,N'-dimethylaminoethyl methacrylate (DMAEMA), 3.2 g of 2,2'-azobis-(2-methylbutyronitrile) and 660 g of water was heated to 75° C. under nitrogen. Then the metered addition was commenced of stream 1 (456 g of VP and 24 g of DMAEMA in 870 g of water), which would take 3 h, and of stream 2 (6.4 g of 2,2'-azobis(2-methylbutyronitrile) in 100 g of ethanol), which would take 4 h. On completion of the metered addition a solution of 4.8 g of 2,2'-azobis-(2-methylbutyronitrile) in 50 g of ethanol was added, and the reaction mixture was stirred at 85° C. for 1 h. A clear viscous polymer solution was obtained. The polymer had a K value of 85.

Polymer 3

A stirred apparatus was charged with 160 g of 1-vinylpyrrolidone, 40 g of 4-vinylpyridine and 650 g of water. The mixture was heated under nitrogen to 70° C., admixed with 3.0 g of 2,2'-azobis(2-amidinopropane) dihydrochloride and stirred at 70° C. for 3 h. Then 1.0 g of 2,2'-azobis(2-amidinopropane) dihydrochloride was added to complete the polymerization at 70° C. in the course of 3 h. The result obtained was a milky white polymer dispersion which became clear on addition of dilute hydrochloric acid or ethanol. The K value of the polymer was 45.4.

Polymer 4

A stirred apparatus was charged with 78.2 g of 1-vinylpyrrolidone (VP), 30.5 g of N,N'-dimethylaminopropylmethacrylamide quaternized with diethyl sulfate (DMAPMA×DES), 0.3 g of 2,2'-azobis(2-amidinopropane) dihydrochloride and 915 ml of water. The initial charge was heated under nitrogen to 65° C., at which point the metered addition was commenced of stream 1 (mixture of 165 g of VP, 62.4 g of DMAPMA×DES and 400 g of water), which would take 4 h, and of stream 2 (2,2'-azobis-(2-amidinopropane) dihydrochloride in 25 ml of water), which would take 6 h. Completion of the metered additions was followed by stirring at 65° C. for 2 h. The result obtained was a clear viscous polymer solution. The polymer had a K value of 315 (0.1% strength in water).

Polymer 5

A stirred apparatus was charged with 154 g of VP, 56 g of N,N'-dimethylaminoethyl methacrylate quaternized with diethyl sulfate (DMAEMA×DES), 0.44 g of 2,2'-azobis(2-amidinopropane) dihydrochloride and 294 g of water. The mixture was heated under nitrogen to 60° C., at which point the metered addition was commenced of stream 1 (462 g of VP and 168 g of DMAEMA×DES in 945 g of water), which would take 3 h, and of stream 2 (3.94 g of 2,2'-azobis(2-amidinopropane) dihydrochloride in 32 g of water), which would take 6 h. Completion of the metered additions was followed by stirring at 60° C. for 2 h. The result obtained was a clear, slightly yellow viscous liquid. The polymer had a K value of 280 (0.1% strength in water). To reduce the residual monomer content, sulfuric acid was added to the polymer solution after it had been diluted with water, and to improve the color it was bleached with $H_2O_2$ after it had been neutralized. The K value decreased by 70 units.

Polymer 6

A mixture of 228 g of VP, 15 g of trimethylammoniumethyl methacrylate chloride (DMAEMA×MeCl), 3.2 g of 2,2'-azobis(2-methylbutyronitrile) and 660 g of ethanol was heated to 75° C. under nitrogen. Then the metered addition was commenced of stream 1 (456 g of VP and 30 g of DMAEMA×MeCl in 870 g of ethanol), which would take 3 h, and of stream 2 (6.4 g of 2,2'-azobis-(2-methylbutyronitrile) in 100 g of ethanol), which would take 4 h. On completion of the metered additions a solution of 4.8 g of 2,2'-azobis(2-methylbutyronitrile) in 50 g of ethanol was added, and the reaction mixture was stirred at 75° C. for 1 h. The polymer thus obtained had a K value of 54.7.

Polymer 7

A stirred apparatus was charged with 83.3 g of 1-vinylpyrrolidone (VP), 17.4 g of N,N'-dimethylaminopropylacrylamide (DMAPMA), 0.32 g of 2,2'-azobis-(2-amidinopropane) dihydrochloride and 900 ml of water. The mixture was heated under nitrogen to 85° C. 30 min later the metered addition was commenced of stream 1 (148.2 g of VP, 30.9 g of DMAPMA and 500 ml of water), which would take 4 h, and of stream 2 (0.58 g of 2,2'-azobis (2-amidinopropane) dihydrochloride in 25 ml of water), which would take 6 h. On completion of the metered additions the mixture was stirred at 85° C. for 2 h. The resulting polymer solution (K value of the polymer: 121, 1% strength in water) was admixed at 50° C. with 32.8 g of dimethyl sulfate in the course of 45 min. The reaction mixture was stirred at 50° C. for 30 min and at 70° C. for 2 h. The K value of the quaternized polymer was 151.

Polymer 8

A stirred apparatus was charged with 17 g of VP, 2 g of 3-methyl-1-vinylimidazolium chloride (VI×MeCl), 0.04 g of mercaptoethanol, 0.1 g of 2,2'-azobis-(2-amidinopropane) dihydrochloride and 185 g of water. The mixture was heated under nitrogen to 65° C., at which point the metered addition was commenced of stream 1 (163 g of VP, 19 g of VI×MeCl and 0.36 g of mercaptoethanol in 60 g of water), which would take 5 h, and of stream 2 (1.3 g of 2,2'-azobis(2-amidinopropane) dihydrochloride in 30 g of water), which would take 6 h. The metered additions were followed by stirring at 65° C. for 2 h, at which point the viscous pale yellow polymer solution was subjected to a steam distillation. The K value of the polymer was 61.4.

Polymer 9

A mixture of 450 g of VP, 5 g of 1-vinylimidazole quaternized with n-octadecyl chloride and 400 g of ethanol was introduced as initial charge and heated with stirring under nitrogen to 70° C., at which point the dropwise addition was commenced of stream 1 (10.5 g of 2,2'-azobis (2-methylbutyronitrile) in 100 g of ethanol), which would take 3 h. After a further 5 h of stirring at 70° C., 1.5 g of 2,2'-azobis(2-methylbutyronitrile) were added. The postpolymerization time was 15 h. The result obtained was a pale yellow viscous polymer solution. The polymer had a K value of 72.0 (1% strength in ethanol).

Polymer 10

A stirred apparatus was charged with 125 g of VP, 125 g of 1-vinylimidazole (VI) and 600 g of water. The mixture was heated under nitrogen to 70° C., at which point a solution of 6 g of 2,2'-azobis[2-(2-imidazolin-2-yl)-propane] dihydrochloride in 30 ml of water was added and the reaction mixture was stirred at 70° C. for 4 h. Postpolymerization was effected at 70° C. in the course of 3 h by twice adding a solution of 1 g of 2,2'-azobis-[2-(2-imidazolin-2-yl)propane] dihydrochloride in 10 ml of water. The result obtained was a yellow viscous polymer solution. The K value of the polymer was 41.8. To quaternize the polymer, 1.4 g of dimethyl sulfate were added to 100 g of the polymer solution. The reaction mixture was stirred at 50° C. for 2 h and at 70° C. for 1 h.

Polymer 11

A stirred apparatus was charged with 150 g of 1-vinylpyrrolidone, 75 g of 1-vinylimidazole, 25 g of N,N'-dimethylaminoethyl methacrylate quaternized with diethyl sulfate (DMAEA×DES) and 625 g of water. The mixture was heated under nitrogen to 70° C. At 65° C. a solution of 5.0 g of 2,2'-azobis(2-amidinopropane) dihydrochloride in 30 g of water was added. The reaction mixture was stirred at 70° C. for 3 h, then admixed with a solution of 1.0 g of 2,2'-azobis(2-amidinopropane) dihydrochloride in 20 g of water, and stirred at 70° C. for a further 3 h. The result obtained was a slightly yellowish brown viscous solution. The K value of the polymer was 83.2.

Polymer 12

A stirred apparatus was charged with 112.5 g of 1-vinylpyrrolidone, 100 g of 1-vinylimidazole, 12.5 g of 3-methyl-1-vinylimidazolium chloride, 25 g of ethyl acrylate and 600 g of water. The mixture was heated under nitrogen to 70° C. At 65° C., a solution of 5.0 g of 2,2'-azobis(2-amidinopropane) dihydrochloride in 30 g of water was added. The reaction mixture was stirred at 70° C. for 3 h, then admixed with a solution of 1.0 g of 2,2'-azobis (2-amidinopropane) dihydrochloride in 20 g of water, and stirred at 70° C. for a further 3 h. The result obtained was a slightly yellowish brown viscous solution. The K value of the polymer was 71.7.

Polymer 13

A mixture of 190 g of 1-vinylpyrrolidone, 10 g of diallyldimethylammonium chloride, 650 g of water and 2.0 g of 2,2'-azobis(2-amidinopropane) dihydrochloride was introduced into a stirred apparatus and heated under nitrogen to 65° C. At that temperature the mixture was stirred for 4 h, then admixed with 1.0 g of 2,2'-azobis-(2-amidinopropane) dihydrochloride, and stirred at 90° C. for a further 3 h. The result obtained was a colorless clear polymer solution. The polymer had a K value of 73.4.

Polymer 14 (novel)

A stirred apparatus was charged with 178 g of water, 142.5 g of a collagen hydrolyzate (Gelita Sol-D, Deutsche Gelatine-Fabriken Stoess & Co. GmbH) and 35.5 g of 1-vinylimidazole (VI). On addition of 0.4 g of t-butyl peroxy-2-ethylhexanoate the mixture was heated under nitrogen to 85° C., at which point the metered addition was commenced of stream 1 (107 g of VI, 75 g of water), which would take 140 min, and of stream 2 (1.9 g of t-butyl peroxy-2-ethylhexanoate, 19 g of ethanol), which would take 155 min. The reaction mixture was diluted with 100 g of water, heated to 90° C. and then admixed dropwise with stream 3 (2.2 g of t-butyl peroxy-2-ethylhexanoate, 9.5 g of ethanol) over 5–10 min. The batch was stirred at 90° C. for a further 2 h and then subjected to a steam distillation. The result obtained was a clear polymer solution. The K value of the polymer was 33.3.

Polymer 15 (novel)

A stirred apparatus was charged with 20 g of a collagen hydrolyzate (Gelita Sol-D, Deutsche Gelatine-Fabriken Stoess & Co. GmbH), 15 g of 1-vinylpyrrolidone, 15 g of 1-vinylimidazole and 130 g of water. On addition of 0.75 g of t-butyl peroxy-2-ethylhexanoate the mixture was heated under nitrogen to 85° C., at which point the metered addition was commenced of stream 1 (100 g of Gelita Sol-D, 75 g of VP, 75 g of VI, 650 g of water), which would take 3 h, and of stream 2 (3.75 g of t-butyl peroxy-2-ethylhexanoate in 40 g of ethanol), which would take 3.5 h. Subsequently stream 3 (1.5 g of t-butyl peroxy-2-ethylhexanoate in 10 g of ethanol) was added dropwise over 10 min and the reaction mixture was stirred at 90° C. for a further 2.5 h. The result obtained was a slightly cloudy, yellowish brown viscous polymer solution. The K value of the polymer was 44.1.

Polymer 16 (novel)

A stirred apparatus was charged with 15 g of a collagen hydrolyzate (Collagel A, Deutsche Gelatine-Fabriken Stoess & Co. GmbH), 30 g of 1-vinylimidazole, 5.0 g of 3-methyl-1-vinylimidazolium chloride and 130 g of water. On addition of 0.75 g of 2,2'-azobis(2-amidino-propane) dihydrochloride the mixture was heated under nitrogen to 65° C., at which point the metered addition was commenced of stream 1 (75 g of Collagel A, 150 g of VI, 25 g of 3-methyl-1-vinylimidazolium chloride, 650 g of water), which would take 3 h, and of stream 2 (3.75 g of 2,2'azobis(2-amidinopropane) dihydrochloride in 40 g of water), which would take 3.5 h. Subsequently stream 3 (1.5 g of 2,2'-azobis(2-amidinopropane) dihydrochloride in 20 g of water) was added dropwise over 15 min and the reaction mixture was stirred at 75° C. for a further 2.5 h. The result obtained was a yellowish brown slightly cloudy polymer solution. The K value of the polymer was 51.8.

APPLICATION EXAMPLES

Wash trials

To test the effectiveness, white test fabric was washed in a Launderometer together with dyed textile samples made of cotton. Dye transfer was measured photometrically. The reflectances measured for the individual test fabrics were used to determine the respective depths of shade, from which the effectiveness of the polymers can be deduced. An effectiveness of 100% means that the test fabric retained its original shade, ie. was not stained. An effectiveness of 0% means that the test fabric has the same depth of shade as a swatch washed without the addition of a dye transfer inhibitor.

The textile samples were dyed with the following dyes:

C.I. Direct Black 51 (constitution number 27720), C.I. Direct Blue 218 (24401), C.I. Direct Red 79 (29065), C.I. Direct Black 22 (35435), C.I. Direct Blue 71 (34140), C.I. Reactive Black 5 (20505).

| Washing conditions | |
|---|---|
| Apparatus | Launderometer |
| Washing cycles | 1 |
| Temperature | 600C |
| Washing time | 30 min |
| Water hardness | 3 mmol of $Ca^{2+}$, $Mg^{2+}$(4:1)/l |
| Test fabric | cotton |
| Liquor ratio | 50:1 |
| Amount of liquor | 250 ml |
| Detergent concentration | 7.0 g/l |
| Detergent composition [%] | |
| Zeolite A | 20 |
| Sodium carbonate | 11 |
| Linear dodecylbenzenesulfonate | 5 |
| Soap | 1.3 |
| $C_{13}/C_{15}$ oxo alcohol × 7 ethylene oxide units | 3.9 |
| Acrylic acid/maleic acid copolymer 70/30, Sodium salt, MW = 70,000 | 2.7 |
| Sodium carboxymethylcellulose | 0.4 |
| Water | 7.0 |
| Polymer as per table | 1.0 |
| Sodium sulfate | to 100% |

Polymer 0 polyvinylpyrrolidone, K value 30 (1% strength in $H_2O$), standard polymer for comparison.
Polymers of this kind are present as color transfer inhibitors in commercial detergents.

TABLE

| | Effectiveness [%] | | | | | | | | | | | | | | | | |
|---|---|---|---|---|---|---|---|---|---|---|---|---|---|---|---|---|---|
| Polymer | 0 | 1 | 2 | 3 | 4 | 5 | 6 | 7 | 8 | 9 | 10 | 11 | 12 | 13 | 14 | 15 | 16 |
| Direct Black 51 | 35 | 32 | 30 | 30 | 42 | 33 | 40 | 39 | 31 | 25 | 45 | 31 | 33 | 32 | 25 | 41 | 39 |
| Direct Blue 218 | 38 | 35 | 35 | 41 | 43 | 39 | 45 | 40 | 47 | 23 | 99 | 43 | 40 | 35 | 99 | 95 | 89 |
| Direct Red 79 | 83 | 81 | 79 | 80 | 85 | 80 | 85 | 82 | 77 | 73 | 90 | 80 | 80 | 78 | 87 | 90 | 87 |
| Direct Black 22 | 81 | 78 | 81 | 76 | 80 | 79 | 81 | 85 | 83 | 71 | 93 | 82 | 80 | 80 | 89 | 90 | 85 |
| Direct Blue 71 | 98 | 96 | 96 | 95 | 98 | 97 | 98 | 97 | 97 | 96 | 99 | 98 | 96 | 95 | 98 | 98 | 97 |
| Reactive Black 5 | 17 | 14 | 17 | 15 | 20 | 13 | 16 | 15 | 13 | 10 | 69 | 40 | 31 | 17 | 51 | 55 | 49 |

The results show that the polymers 1 to 16 not only match polyvinylpyrrolidone in effectiveness but in some instances even exceed it.

Adsorption test

The test is designed to examine the adsorption characteristics of the polymers on the activated sludge of a biological water treatment plant. The polymer is dissolved in an aqueous activated sludge suspension. The concentration of the polymer is at least 100 mg/l, based on the dissolved organic carbon (DOC). The activated sludge concentration is 1 g/l, based on the dry weight. After 48 h DOC is measured in the supernatant above the sludge sediment. Beforehand, fine particles of activated sludge are removed.

$$\text{Degree of elimination in \%} = \frac{\text{DOC (original)} - \text{DOC (final)}}{\text{DOC (original)}} \times 100$$

| | Degree of elimination in % |
|---|---|
| Polymer 0 | <5 |
| Polymer 5 | 67 |
| Polymer 8 | 68 |
| Polymer 9 | 69 |

While polyvinylpyrrolidone is not adsorbed by activated sludge, the degree of elimination of polymers 5, 8 and 9 is close to 70%. The polymers prepared in the presence of water-soluble proteins or protein hydrolyzates also exhibit at least partial degradability (Zahn-Wellens test).

We claim:

1. A method of washing dyed textiles, comprising:
washing said dyed textiles with an aqueous solution of a detergent or cleaner formulation containing at least one surfactant, a dye transfer inhibiting copolymer prepared by free radically initiating the copolymerization of a monomer mixture of
(a) 60–99% by weight of 1-vinylpyrrolidone or a mixture of 1-vinylpyrrolidone and 1-vinylimidazole;
(b) 1–40% by weight of N,N'-dialkylaminoalkyl(meth)acrylates, N,N'-dialkylaminoalkyl(meth)acrylamids, 4-vinylpyridine, 2-vinylpyridine and/or diallyldialkylamines, each in the form of the free bases, in the form of a salt or in quaternized form, and/or 1-vinylimidazolium compounds of the formula

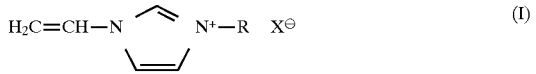

where R is $C_1$–$C_{18}$-alkyl or benzyl and $X^\ominus$ is an anion, and optionally
(c) up to 20% by weight of other monoethylenically unsaturated monomers,
and optionally a builder.

2. A detergent composition for the washing of dyed textiles, comprising:
at least one surfactant, in combination with from 0.1 to 10% by weight of a dye transfer inhibiting copolymer prepared by the free-radical initiated copolymerization of a monomer mixture consisting essentially of:
(a) 60–99% by weight of 1-vinylpyrrolidone or a mixture of 1-vinylpyrrolidone and 1-vinylimidazole;
(b) 1–40% by weight of nitrogen-containing, basic ethylenically unsaturated monomers in the form of the free bases, in the form of the salts with organic or inorganic acids or in quaternized form; and optionally
(c) up to 20% by weight of other monoethylenically unsaturated monomers,
in an aqueous medium in the presence of from 0.5 to 400 parts by wt. of water-soluble proteins or partially degraded proteins in the presence of free radical initiators per 100 parts by weight of monomer.

3. The composition of claim 2, wherein said monomer (b) is a N,N'-dialkylaminoalkyl(meth)acrylate, a N,N'-dialkylaminoalkyl(meth)acrylamide, or combination thereof.

4. The composition of claim 3, wherein said N,N'-dialkylaminoalkyl(meth)acrylate is dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, dimethylaminobutyl methacrylate, dimethylaminoneopentyl acrylate or dimethylaminoneopentyl methacrylate, and said N,N'-dialkylaminoalkyl(meth)acrylamide is dimethylaminoethylacrylamide, dimethylaminoethylmethacrylamide, diethylaminoethylacrylamide, diethylaminoethylmethacrylamide, dipropylaminoethylacrylamide, dipropylaminoethylmethacrylamide dimethylaminopropylacrylamide, dimethylaminopropylmethacrylamide, diethylaminopropylacrylamide, diethylaminopropylmethacrylamide, dimethylaminoneopentylacrylamide, dimethylaminoneopentylmethacrylamide or dialkylaminobutylacrylamide.

5. The composition of claim 2, wherein the protein which is partially degraded to said partially degraded protein is a scleroprotein.

6. The method of claim 1, wherein said at least one surfactant is an anionic surfactant.

7. The composition of claim 2, wherein said at least one surfactant is an anionic surfactant.

* * * * *